(12) United States Patent  
Yamamoto (10) Patent No.: US 12,129,354 B2  
(45) Date of Patent: Oct. 29, 2024

(54) METHOD FOR MANUFACTURING CARBON NANOTUBE-BLENDED AGGREGATE

(71) Applicant: ZEON CORPORATION, Tokyo (JP)

(72) Inventor: Hirofumi Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 521 days.

(21) Appl. No.: 17/635,463

(22) PCT Filed: Aug. 13, 2020

(86) PCT No.: PCT/JP2020/030741  
§ 371 (c)(1),  
(2) Date: Feb. 15, 2022

(87) PCT Pub. No.: WO2021/033614  
PCT Pub. Date: Feb. 25, 2021

(65) Prior Publication Data  
US 2022/0315730 A1  Oct. 6, 2022

(30) Foreign Application Priority Data

Aug. 16, 2019  (JP) .................... 2019-149429

(51) Int. Cl.  
*C08K 3/04* (2006.01)  
*C08J 3/16* (2006.01)  
(Continued)

(52) U.S. Cl.  
CPC .............. *C08K 3/041* (2017.05); *C08J 3/16* (2013.01); *C08J 5/243* (2021.05); *C08J 3/21* (2013.01);  
(Continued)

(58) Field of Classification Search  
CPC .... C08K 3/041; C08K 9/08; C08J 3/16; C08J 2300/14; C08J 3/21; C08J 3/212  
See application file for complete search history.

(56) References Cited

U.S. PATENT DOCUMENTS 6,346,023 B1   2/2002  Tsuboi et al.  
7,008,563 B2   3/2006  Smalley et al.  
(Continued)

FOREIGN PATENT DOCUMENTS

CN      100999314 A    7/2007  
JP      2000-086219 A  3/2000  
(Continued)

OTHER PUBLICATIONS

Machine translation of JP-2016037531-A obtained from IP.com (Year: 2016).*

(Continued)

*Primary Examiner* — Kregg T Brooks  
*Assistant Examiner* — David R. Foss  
(74) *Attorney, Agent, or Firm* — KENJA IP LAW PC (57) ABSTRACT

A method for manufacturing a carbon nanotube-blended aggregate of the present invention includes the steps of: (1) providing an aqueous solution of a water-soluble polymer having a concentration of 0.005 to 3.0% by mass; (2) impregnating carbon nanotubes with the aqueous solution of the water-soluble polymer in a proportion of 400 to 1,000 parts by mass relative to 100 parts by mass of the carbon nanotubes to prepare a wet aggregate; (3) shear-crushing the wet aggregate to obtain an aggregate of crushed products and (4) drying the aggregate of the crushed products to obtain a carbon nanotube-blended aggregate containing the water-soluble polymer.

10 Claims, 2 Drawing Sheets

(51) Int. Cl.
  *C08J 3/21* (2006.01)
  *C08J 5/24* (2006.01)
  *C08K 9/08* (2006.01)

(52) U.S. Cl.
  CPC ........ *C08J 2300/14* (2013.01); *C08J 2339/04* (2013.01); *C08K 9/08* (2013.01)

(56) References Cited

U.S. PATENT DOCUMENTS

| | | |
|---|---|---|
| 7,501,108 B2 | 3/2009 | Yerushalmi-Rozen et al. |
| 9,868,153 B2 | 1/2018 | Suzuki |
| 2009/0218549 A1 | 9/2009 | Kato et al. |
| 2011/0081546 A1 | 4/2011 | Kim et al. |
| 2011/0204296 A1 | 8/2011 | Conzen et al. |

FOREIGN PATENT DOCUMENTS

| | | | | |
|---|---|---|---|---|
| JP | 2004-506530 A | | 3/2004 | |
| JP | 2004-531442 A | | 10/2004 | |
| JP | 2010-241668 A | | 10/2010 | |
| JP | 2011-523929 A | | 8/2011 | |
| JP | 2012-500458 A | | 1/2012 | |
| JP | 2012-097133 A | | 5/2012 | |
| JP | 2015214450 A | * | 12/2015 | |
| JP | 2016037531 A | * | 3/2016 | |
| JP | 2019-102177 A | | 6/2019 | |
| JP | 6714134 B1 | | 6/2020 | |
| WO | WO-2004097853 A1 | * | 11/2004 | ............ B82Y 10/00 |

OTHER PUBLICATIONS

Machine translation of JP-2015214450-A obtained from IP.com (Year: 2015).*
International Search Report and Written Opinion (PCT/JP2020/030741) dated Oct. 27, 2020 (with English translation).
Japanese Office Action (Application No. 2019-149429) dated Oct. 25, 2019 (with English translation).
Aug. 17, 2023, Office Action issued by the Intellectual Property India in the corresponding Indian Patent Application No. 202217008954.
Sep. 22, 2023, the Extended European Search Report issued by the European Patent Office in the corresponding European Patent Application No. 20853953.6.
Berber, Mohamed Reda, et al., "Carbon Nanotubes—Current Progress of their Polymer Composites ‖ Carbon Nanotube-Based Polymer Composites: Synthesis, Properties and Applications., 10.5772/61428 (Chapter 1),"—doi:10/5772/62497, Jan. 1, 2016, pp. 1-46.
Indian Office Action (Application No. 202217008954) dated Apr. 25, 2022.
May 7, 2024, Communication pursuant to Article 94(3) EPC issued by the European Patent Office in the corresponding European Patent Application No. 20853953.6.
English translation of the International Preliminary Report on Patentability (Chapter I) dated Mar. 3, 2022 (Application No. PCT/JP2020/030741).
Russian Office Action (with English translation) dated Oct. 18, 2022 (Application No. 2022104058).
Taiwanese Office Action (with English translation) dated Nov. 24, 2022 (Application No. 109127696).

* cited by examiner

METHOD FOR MANUFACTURING CARBON NANOTUBE-BLENDED AGGREGATE

BACKGROUND OF THE INVENTION

Technical Field

The present invention relates to a method for manufacturing a carbon nanotube-blended aggregate.

Background Art

In recent years, carbon nanotubes (hereinafter referred to also as CNTs) have attracted attention as dream next-generation materials, and application development thereof is in progress, intended not only for use as antistatic agents and conductivity-imparting materials, but also for utilization in tires, capacitors, conductive aids for Li batteries, fiber reinforced plastics, and the like.

CNTs are carbon crystals having a diameter of several nm to about 500 nm, a length of about 10 µm to 1,000 µm, a large aspect ratio, and a tubular structure. Various types of CNTs exist, including single-walled CNTs having a monolayer structure, and dual-layer double-walled CNTs falling under the category of multi-walled CNTs having a multilayer structure. In addition, CNTs include those which are closed at both ends, those which are closed at only one end and those which are open at both ends, and there are several types of their rolled structures such as armchair type.

Also, methods for manufacturing CNTs include arc discharge type, catalytic vapor phase manufacture method, laser ablation method and other manufacture methods, each of which has advantages and disadvantages.

In general, CNTs are known to be blended with various synthetic resins, rubbers and other base materials to impart electrical conductivity, high elasticity, high strength, thermal conductivity and the like to the base materials.

However, when used, CNTs involve concerns about safety and have problems such as difficulty in falling apart and lack of dispersibility because they are tubular and entangled one by one, as well as easiness to scatter and lack of handleability. Therefore, they have not been put into practical use so much despite expectation thereto as "dream materials."

Concerning the safety of CNTs, according to the opinion announced by the IARC (International Agency for Research on Cancer) in 2014, most CNTs are classified into "Group 3" (not classifiable as to its carcinogenicity to humans). However, even today, general users strongly recognize that "but CNTs are dangerous materials." One of the reasons for this is said to be as follows: CNTs form a fibrous structure similar to that of asbestos; and CNTs have a very low bulk density, i.e., 1 to 5 g/100 cc, and also have high scattering properties since a large amount of air is entrained therein, and thus have a great risk of suction to humans.

In general, the environmental risk refers to the possibility that chemical substances and the like may adversely affect, via the environment, human health and growth and development of animals and plants, and is conceptually represented as "risk=harmfulness (toxicity)×exposure level (intake amount)." Even a clearly harmful material can be said to be almost safe if the exposure level thereof is zero.

As products having a reduced exposure level, granulated products and aggregates are preferable, which do not pulverize or scatter during packaging, transportation, inventory, actual use, etc., and which are easily dispersed in a dispersion step during kneading, molding, etc. of master batches and compounds of synthetic resins. Aggregates which do not pulverize naturally have a high bulk density, and thus have merits, for example, that the aggregates can prevent the occurrence of bridges in a storage tank and can be automatically quantified when supplied in a step of kneading them with a synthetic resin or the like, which leads to a reduction in transportation and inventory costs.

Carbon-based powders having a spherical particle form as a final product form include carbon black (hereinafter referred to also as CB) manufactured and sold worldwide at 12 million tons/year. The bulk density of CB is not as low as that of CNT, but is considerably low, and thus a pan type granulation method, a drum type granulation method, a screw extrusion type granulation method, a stirring-type granulation method, a compression molding granulation method, or the like using water as a binder is adopted. Primary particles of CB are spherical, and, besides, CB forms a structure in which particles are fused, has functional groups, such as oxygen and hydrogen, existing on surfaces of the particles thereof, and has an affinity with water that functions as a binder. Therefore, CB can be relatively easily granulated.

In consideration of influences on the environment, water is preferably used also as a solvent at the time of manufacturing aggregates and granulated products of CNTs. However, CNTs have a developed crystal structure and include few surface functional groups, and, further, more air is entrained in a powder aggregate of CNTs than in CB. For such reasons, CNTs have low affinity with water and are not easily granulated. Therefore, various techniques for uniformly dispersing CNTs while using water as a solvent have been studied so far. Patent Document 1 discloses a method of adding CNTs to an organic solvent such as acetone and performing ultrasonic dispersion to disperse the CNTs in the organic solvent.

Patent Document 2 discloses a technique of dispersing CNTs in water using a dispersant composed of a diallylamine-based cationic polymer, an anionic surfactant, and a nonionic surfactant.

However, neither Patent Document 1 nor Patent Document 2 reports the bulk density or scattering properties of a CNT-blended aggregate obtained when water is used as a solvent.

PRIOR ART DOCUMENTS

Patent Documents

Patent Document 1: JP 2000-086219 A
Patent Document 2: JP 2010-241668 A

SUMMARY OF THE INVENTION

Technical Problem

An object of the present invention is to provide a method for efficiently acquiring a CNT-blended aggregate having a high bulk density and low scattering properties using water as a dispersion medium.

The present inventors have now found that a CNT-blended aggregate having a high bulk density and low scattering properties can be efficiently acquired easily and conveniently by impregnating CNTs with an aqueous solution containing a water-soluble polymer in a predetermined concentration to form a wet aggregate, subjecting the wet aggregate to a shear-crushing treatment and then drying the shear-crushed aggregate. The present invention is based on such findings.

Solution to Problem

A method for manufacturing a carbon nanotube-blended aggregate of the present invention includes the steps of:
(1) providing an aqueous solution of a water-soluble polymer having a concentration of 0.005 to 3.0% by mass;
(2) impregnating carbon nanotubes with the aqueous solution of the water-soluble polymer in a proportion of 400 to 1,000 parts by mass relative to 100 parts by mass of the carbon nanotubes to prepare a wet aggregate;
(3) shear-crushing the wet aggregate to obtain an aggregate of crushed products; and
(4) drying the aggregate of the crushed products to obtain a carbon nanotube-blended aggregate containing the water-soluble polymer.

Advantageous Effects of the Invention

The present invention makes it possible to efficiently manufacture a CNT-blended aggregate having a high bulk density and low scattering properties using water as a dispersion medium. Further, the present invention makes it possible to manufacture a CNT-blended aggregate without substantially using an organic solvent, and thus is advantageous in reducing the environmental load.

DETAILED DESCRIPTION OF THE INVENTION

According to one embodiment of the present invention, a method for manufacturing a CNT-blended aggregate including: providing an aqueous solution of a water-soluble polymer having a concentration of 0.01 to 3.0% by mass (step 1); impregnating carbon nanotubes with the aqueous solution of the water-soluble polymer in a proportion of 0.1 to 0.25 parts by mass relative to 100 parts by mass of the carbon nanotubes to prepare a wet aggregate (step 2); shear-crushing the wet aggregate to obtain an aggregate of crushed products (step 3); and then drying the aggregate of the crushed products (step 4) is used, whereby a CNT-blended aggregate can be obtained. Hereinafter, the method for manufacturing a CNT-blended aggregate according to the present invention will be described in detail for each step.

[Step (1): Step of Providing Aqueous Water-Soluble Polymer Solution]

In one embodiment of the present invention, in the above step (1), an aqueous solution of a water-soluble polymer is provided. The water-soluble polymer is not particularly limited as long as CNTs can be dispersed and stabilized in water, and a polymer having a cationic group such as a quaternary ammonium group in the main chain or side chain can be preferably used.

According to one embodiment of the present invention, a diallylamine-based cationic polymer can be suitably used as the water-soluble polymer. Examples of the diallylamine-based cationic polymer include polymers of secondary amine salts such as diallylamine hydrochlorides and sulfates, and polymers of quaternary ammonium salts such as polydiallyldialkylammonium chloride and polydiallyldialkylammonium bromide. Among them, a polymer of a quaternary ammonium salt is preferable, and a polymer of diallyldimethylammonium chloride is particularly preferable.

According to another embodiment of the present invention, the water-soluble polymer may be a copolymer obtained by polymerizing a monomer having at least one quaternary ammonium group and a polyfunctional monomer having no at least one quaternary ammonium group. The mass ratio of the monomer having a quaternary ammonium group to the polyfunctional monomer is preferably 90/10 to 10/90, more preferably 75/25 to 40/60, further preferably 60/40 to 50/50.

Among the constituent elements of the copolymer constituting the water-soluble polymer, the monomer having a quaternary ammonium group may be preferably selected from monomers of the following formula (I):

wherein $R_1$ is H or $C_1$-$C_4$-alkyl, $R_2$ is H or methyl, $R_3$ is $C_1$-$C_4$-alkylene, and $R_4$, $R_5$ and $R_6$ are each independently H or $C_1$-$C_{30}$-alkyl, X is —O— or —NH—, and Y is Cl, Br, I, bisulfate or methosulfate. Preferable monomers of formula (I) are those in which $R_1$ and $R_2$ are each H, or $R_1$ is H and $R_2$ is $CH_3$ or preferably similarly H.

A particularly preferable monomer of formula (I) is [2-(acryloyloxy)ethyl]trimethylammonium chloride, referred to also as dimethylaminoethyl acrylate methochloride (DMA3*MeCl), or trimethyl-[2-(2-methylprop-2-enoyloxy)ethyl]azanium chloride referred to also as dimethylaminoethyl methacrylate methochloride (DMAEMA*MeCl).

Among the constituent elements of the copolymer constituting the water-soluble polymer, the polyfunctional monomer having no at least one quaternary ammonium group includes acrylic acid, methacrylic acid, N-vinylpyrrolidone, N-vinylimidazole, methyl esters and ethyl esters of itaconic acid and maleic acid, ethyl acrylate, and methyl acrylate.

Further, according to one embodiment, the polyfunctional monomer having no quaternary ammonium group is preferably selected from monomers represented by the following formula (II):

wherein $R_7$ is H or $C_1$-$C_4$-alkyl, $R_8$ is H or methyl, and $R_9$ and $R_{10}$ are each independently H or $C_1$-$C_{30}$-alkyl.

The monomer of the above formula (II) is preferably acrylamide, methacrylamide or dialkylaminoacrylamide.

Further, among the polyfunctional monomers described above, the polyfunctional monomer having no quaternary ammonium group may also be a non-amine-based monomer represented by the following formula (III):

R—O—(CH$_2$—CHR'—O)$_n$—CO—CR''=CH$_2$ (III)

Wherein R is H or C$_6$-C$_{50}$-alkyl, R' is H or C$_1$-C$_4$-alkyl, R'' is H or methyl, and n is an integer from 0 to 100.

In the non-amine-based monomer of the above formula (III), R is preferably C$_8$-C$_{30}$-alkyl, more preferably C$_{16}$-C$_{22}$-alkyl, R' is preferably H, and n is preferably 3 to 50.

The non-amine-based monomer of formula (III) is preferably an aliphatic alcohol ethoxylate or a methacrylate thereof.

A plurality of types of monomers of each of the above formula (I), the above formula (II), and the above formula (III) may be used in the copolymer constituting the water-soluble polymer. Therefore, for example, monomers with different chain lengths, containing C$_{16}$ and C$_{18}$ as the R group, may be present as the monomer of the above formula (III) in the copolymer.

According to one embodiment, the copolymer constituting the water-soluble polymer is preferably a copolymer composed of dialkylaminoalkyl (meth)acrylate and a monomer unit selected from alkyl (meth)acrylate, hydroxyalkyl (meth)acrylate and combinations thereof. More specifically, the copolymer described above is preferably a copolymer containing di-C$_1$-C$_2$-alkylamino-C$_1$-C$_2$-alkyl (meth)acrylate, and a monomer unit selected from C$_1$-C$_4$-alkyl (meth)acrylate, monohydroxy C$_2$-C$_4$-alkyl (meth)acrylate and combinations thereof, more preferably a methyl (meth)acrylate/butyl (meth)acrylate/dimethylaminoethyl (meth)acrylate copolymer, further preferably a methyl methacrylate/butyl methacrylate/dimethylaminoethyl methacrylate copolymer. Such a methyl methacrylate/butyl methacrylate/dimethylaminoethyl methacrylate copolymer may be a commercially available one, and is, for example, EUDRAGIT (registered trademark) E100 (Degussa).

Examples of the water-soluble polymers other than those described above include polymers having a cationic group (such as primary to quaternary ammonium salts) introduced into the main chain or side chain, such as polystyrene derivatives, cationized starch, cationized guar gum, modified polyvinyl alcohol, cationized polyacrylamide, polyamide epichlorohydrin (PAE), melamine resin derivatives, polyvinylamine and derivatives thereof, polyvinylpyridine and derivatives thereof, polyamines, polymethacrylic acid ester derivatives, polyacrylic acid ester derivatives, sodium polyacrylate derivatives, polyethyleneimine and derivatives thereof, polyDADMAC, polyalkylene polyamine and derivatives thereof, and polyallylamine and derivatives thereof.

The molecular weight of the water-soluble polymer depends on the type of CNTs impregnated with the water-soluble polymer, but may be about 5,000 to 100,000 from the viewpoint of dispersing and stabilizing CNTs in water. Further, from the viewpoint of adhesiveness (cohesiveness) between granules when formed by shear-crushing the formed wet aggregate, the weight average molecular weight of the water-soluble polymer is preferably 8,000 to 50,000. The weight average molecular weight can be routinely measured by a gel permeation chromatography (GPC) method (polystyrene standard).

An aqueous solution of the water-soluble polymer as described above can be prepared by adding the water-soluble polymer to water and dissolving the polymer therein. In the manufacture method of the present invention, the concentration of the water-soluble polymer in the aqueous solution of the water-soluble polymer is set to 0.005 to 3.0% by mass. When the water-soluble polymer concentration is lower than 0.005% by mass, CNTs are hardly impregnated with water in the preparation of a CNT-blended wet aggregate, so that no CNT-blended wet aggregate can be obtained. On the other hand, when the water-soluble polymer concentration is higher than 3.0% by mass, the obtained CNT-blended wet aggregate is hard, so that CNTs are hardly dispersed uniformly. A preferable water-soluble polymer concentration is 0.01 to 3.0% by mass, more preferably 0.1 to 2.5% by mass.

Purified water such as distilled water with few impurities or ion-exchanged water, or pure water is preferably used as the water, from the viewpoint of maintaining the quality of a CNT-blended aggregate.

[Step (2): Step of Preparing Wet Aggregate]

Next, carbon nanotubes are impregnated with the aqueous solution of the water-soluble polymer in a proportion of 700 to 950 parts by mass relative to 100 parts by mass of the carbon nanotubes to prepare a wet aggregate.

The CNTs to be used in the present invention are not particularly limited, and may be in any of forms such as single-walled CNTs having a monolayer structure and dual-layer double-walled CNTs falling under the category of multi-walled CNTs having a multilayer structure. Further, it is known that the CNTs obtained differ in form depending on the manufacture method. In the present invention, CNTs may be obtained by any of manufacture methods including arc discharge type, catalytic vapor phase manufacture method, laser ablation method, and other manufacture methods.

The CNTs as a raw material used in the method for manufacturing a CNT-blended aggregate of the present invention have a fiber diameter of preferably 1 nm to 200 nm, more preferably 1 nm to 150 nm, further preferably 1 nm to 100 nm, from the viewpoint of ensuring superiority in electrical and mechanical properties and physical properties such as dispersibility.

The fiber length of the CNTs is preferably 0.1 µm to 2,000 µm, more preferably 0.1 µm to 1,000 µm, further preferably 0.1 µm to 500 µm, from the viewpoint of ensuring electrical conductivity, mechanical properties, and dispersibility and avoiding cutting of fibers.

The aspect ratio of the CNTs is usually about 10 to 10,000, and a structure in which a hexagonal mesh graphite sheet has a cylindrical shape is suitably used. The CNTs to be used may be either monolayer CNTs or multilayer CNTs, and can be selected according to the final purpose. In addition, the method for manufacturing CNTs is not limited, and may be any of a pyrolysis method in which a carbon-containing gas is brought into contact with a catalyst, an arc discharge method in which arc discharge is generated between carbon rods, a laser evaporation method in which a carbon target is irradiated with a laser, a CVD method in which a gas from a carbon source is reacted at a high temperature in the presence of fine metal particles, a HiPco method in which carbon monoxide is decomposed under a high pressure, and the like. Further, the CNTs may be doped with metal atoms. In addition, these CNTs may be used alone, or two or more thereof may be used in combination.

The method of impregnating the CNTs with the aqueous solution of the water-soluble polymer obtained as described above is carried out by adding the aqueous solution of the water-soluble polymer to a CNT agglomerate. The addition of the aqueous solution of the water-soluble polymer may be performed either in one step by a batch method or in a plurality of steps, but is preferably performed continuously using a screw conveyor.

According to one embodiment of the present invention, the CNTs and the aqueous solution of the water-soluble polymer may be mixed together in a screw conveyor by delivering the aqueous solution of the water-soluble polymer from the middle of the screw conveyor while transporting the CNTs using the screw conveyor. This mixing method is preferable for continuously and efficiently impregnating the CNTs with the aqueous solution of the water-soluble polymer, and can provide a wet aggregate in which the CNTs are uniformly dispersed. The speed at which the CNTs are transported in the screw conveyor is not particularly limited, and is, for example, 0.25 to 1.0 kg/min. The amount of the aqueous solution of the water-soluble polymer to be blended will be described later.

In the step of preparing a wet aggregate, the aqueous solution of the water-soluble polymer is added to the CNTs in a proportion of 400 to 1,000 parts by mass relative to 100 parts by mass of the CNTs. If the amount of the aqueous solution of the water-soluble polymer to be added is less than 400 parts by mass, some parts of the obtained wet aggregate are not impregnated with the aqueous solution of the water-soluble polymer, and thus appropriate granules cannot be obtained in the subsequent shear-crushing step. On the other hand, if the amount of the aqueous solution of the water-soluble polymer to be added exceeds 1,000 parts by mass, the CNTs cannot completely absorb the aqueous solution and are brought into a slurry state, and thus cannot be crushed in the subsequent shear-crushing step. The amount of the aqueous water-soluble polymer solution to be added is preferably 500 to 950 parts by mass, more preferably 700 to 900 parts by mass.

The wet aggregate obtained by impregnating the CNTs with the aqueous solution of the water-soluble polymer have a water content, at room temperature, of preferably 600 to 980 parts by mass, more preferably 700 to 900 parts by mass, based on 100 parts by mass of the CNTs. By setting the water content of the wet aggregate within the above range, a desired aggregate can be easily obtained in the shear-crushing step.

When the aqueous solution of the water-soluble polymer is added (impregnated) into the CNTs using a screw conveyor, the time required for the impregnation is usually about 1 to 3 minutes, and can be appropriately adjusted by the rotation speed of the screw.

As described above, in the present invention, the CNTs are impregnated with the aqueous solution of the water-soluble polymer to prepare a wet aggregate, and thus it is not necessary to use an organic solvent as the dispersion medium as in conventional cases. Therefore, a device for recovering the organic solvent used is not required, and thus a CNT-blended aggregate can be easily and conveniently manufactured. An organic solvent is preferably not used, but is not prohibited from being used, and may be contained, in a small amount, in the solution of the water-soluble polymer.

[Step (3): Step of Shear-Crushing Wet Aggregate]

Next, the CNT-blended wet aggregate obtained in the above step (2) is shear-crushed to obtain an aggregate of crushed products. The aggregate of crushed products is produced by contacting and adhering crushed products of the wet aggregate with/to each other during a shear-crushing treatment, and has low scattering properties and can be advantageously utilized in safely manufacturing a CNT-blended aggregate.

Here, the shear-crushing treatment refers to a treatment of applying a shear force to a sample to make the sample fine. Examples of devices used for shear-crushing include a device that finely divides the CNT-blended wet aggregate charged by a blade that rotates at a high speed and a blade of a fixed cutting head and a device that simultaneously performs shearing and high-speed stirring of the CNT-blended wet aggregate using the shear force and impact generated in a gap between two discs having high relative speeds. Examples of specific devices used for shear-crushing include Comitrol, a colloidal mill, an electric mill, a mass-colloider, a food processor, a pulper finisher, a rotary cutter mill, Micro-Meister and a nanochopper. A rotary cutter mill is preferable, and a multi-stage rotary cutter mill is more preferable. The multi-stage rotary cutter mill can be advantageously used for adjusting the cutting efficiency by appropriately changing the number of blades in consideration of the grain size of crushed products of a CNT-blended wet aggregate and the production rate of an aggregate thereof.

The conditions for operating the device in the shear-crushing treatment are not particularly limited, but are preferably set from the viewpoint of efficient production of the CNT-blended aggregate. Specifically, the temperature in the device during the shear-crushing treatment is, for example, about 20° C. to 90° C. The rotation speed of the blade is about 350 to 600 rpm, preferably about 500 to 600 rpm.

The shear-crushing treatment step may be performed once or repeated twice or more.

[Step (4): Drying Step]

According to one embodiment of the present invention, the aggregate of the crushed products obtained in step (3) are dried to obtain a carbon nanotube-blended aggregate.

The drying method is not particularly limited, and can be carried out by steam drying, vacuum drying, hot air drying or the like. The temperature at this time is preferably 200° C. or lower for a steam dryer, 150° C. or lower for a vacuum dryer, or 100° C. or less for hot air drying, from the viewpoint of preventing decomposition and denaturation of the water-soluble polymer that coats the CNTs. Further, if the granulated products are spread on a tray or the like and naturally dried at room temperature in a draft or the like before drying with a dryer, the subsequent steps can be easily carried out.

Further, according to one embodiment of the present invention, granulation of the carbon nanotube-blended aggregate may be further performed. Granulators to be used are roughly divided into horizontal ones and vertical ones. The horizontal granulators are mostly of continuous type, including various ones such as those which are composed of a one-stage or multiple-stage drum, perform granulation with a stirring pin and continuous drying in a kiln drum, and those which perform compression and drying while performing kneading with two shafts. These granulators are useful because they have a great cost merit due to their continuous operability and are frequently used for general purposes. Further, the vertical granulators are divided into continuous ones and batch ones. Some of the continuous granulators perform the granulation step and the drying step at the same time, which are suitable for mass production. In addition, some of the batch granulators perform the granulation step and the drying step separately, some of which require filtration or the like to recover the granulated products in the middle of the process.

In general, granulation and drying are performed in a wet manner. Typically, a fluidized bed granulator, a stirring granulator, a rolling granulator, a spray-drying granulator, and the like are exemplified, and these granulators include composite types thereof. In addition, methods such as a granulation method using an airborne drying device, a vacuum compression granulation method and a flushing method are exemplified.

The method of the present invention does not require a step of removing an organic solvent, includes a small number of steps, and can be continuously carried out, and thus can be advantageously used for efficiently and quickly manufacturing the CNT-blended aggregate.

[CNT-Blended Aggregate]

According to one embodiment of the present invention, the CNT-blended aggregate obtained by the method described above is provided. According to one embodiment, the bulk density of the CNT-blended aggregate is preferably 0.1 to 0.4 g/cm$^3$, more preferably 0.15 to 0.3 g/cm$^3$, further preferably 0.2 to 0.25 g/cm$^3$.

The average particle size of the CNT-blended aggregates is preferably 0.3 to 2.5 mm, more preferably 0.5 to 2.0 mm, further preferably 1.0 to 1.5 mm. The average particle size refers to an average value obtained by calculating the particle sizes of 100 randomly extracted CNT-blended aggregates through microscopic observation of the aggregates.

The porosity of the CNT-blended aggregate is preferably 10 to 35%, more preferably 15 to 30%, further preferably 20 to 25%.

The CNT-blended aggregate obtained by the manufacture method of the present invention has a very high bulk density as described above, and thus has merits, for example, that the CNT-blended aggregate can prevent the occurrence of bridges in a storage tank and can be automatically quantified when supplied in a step of kneading it with a synthetic resin or the like, which leads to a reduction in transportation and inventory costs.

The gist of the present invention is as follows.

[1] A method for manufacturing a carbon nanotube-blended aggregate, including the steps of:
(1) providing an aqueous solution of a water-soluble polymer having a concentration of 0.01 to 3.0% by mass;
(2) impregnating carbon nanotubes with the aqueous solution of the water-soluble polymer in a proportion of 400 to 1,000 parts by mass relative to 100 parts by mass of the carbon nanotubes to prepare a wet aggregate;
(3) shear-crushing the wet aggregate to obtain an aggregate of crushed products; and
(4) drying the aggregate of the crushed products.

[2] The method according to [1], wherein the wet aggregate preparation step (1) is continuously carried out using a screw conveyor.

[3] The method according to [1] or [2], wherein the wet aggregate has a water content, at room temperature, of 680 to 980 parts by mass based on 100 parts by mass of the carbon nanotubes.

[4] The method according to any one of [1] to [3], wherein the water-soluble polymer is polydiallyldimethylammonium chloride.

[5] The method according to any one of [1] to [4], wherein a shear-crushing treatment in step (3) is continuously performed using a cutter mill.

[6] The method according to [5], wherein the cutter mill is a multi-stage cutter mill.

[7] The method according to any one of [1] to [6], wherein the shear-crushing treatment of the wet aggregate is performed until an average particle size of the crushed products is brought into a range of 0.5 to 2 mm.

[8] The method according to any one of [1] to [7], wherein the drying step (4) is carried out by hot air drying.

[9] The method according to any one of [1] to [8], wherein the carbon nanotube-blended aggregate has a bulk density of 0.15 to 0.30 g/cm$^3$.

[10] The method according to any one of [1] to [9], wherein the carbon nanotube-blended aggregate has an average particle size of 0.5 to 2.0 mm.

[11] The method according to any one of [1] to [10], wherein the carbon nanotube-blended aggregate has a porosity of 15 to 30%.

EXAMPLES

Hereinafter, the present invention will be specifically described with reference to Examples. The present invention is not limited to these Examples.

The physical properties of CNTs (trade names: Knanos-100P, 100T, 210T and 300T, manufactured by Kumoho Co., Ltd.) used in the following experiment were as indicated in Table 1.

TABLE 1

|  | Physical properties (average) |
| --- | --- |
| Diameter (nm) | 8 to 15 |
| Length (μm) | 27 |
| Specific surface area (m$^2$/g) | 1,000 to 2,000 |
| Bulk density (g/cc) | 0.015 to 0.14 |
| Carbon content (% by mass) | 90 or more |

Example 1

Figure 1:
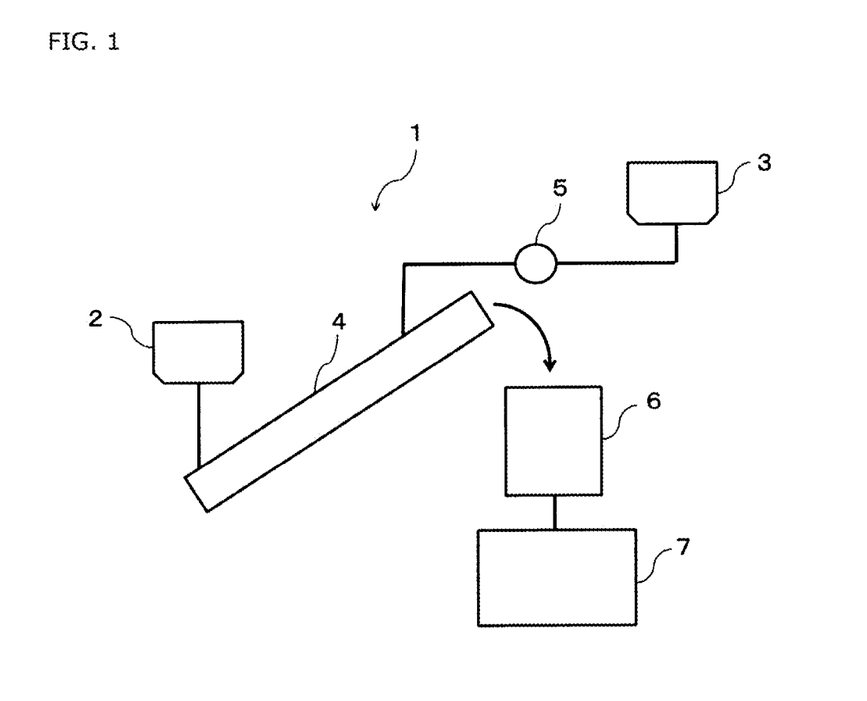
FIG. 1 is a schematic view of an apparatus for manufacturing a carbon nanotube-blended aggregate used in Example 1.

CNT-blended aggregates were manufactured using a CNT-blended aggregate manufacturing apparatus 1 shown in FIG. 1. First, 500 g of CNTs were charged into a feeder 2 for main raw material, and an aqueous solution of a water-soluble polymer in which 4.37 g of a polydiallyldimethylammonium chloride polymer (trade name: FPA1000L, manufactured by SENKA Corporation), as a water-soluble polymer, was dissolved in 3,500 g of water was charged into a feeder 3 for dispersion medium.

Next, a screw mixer 4 was operated to deliver the aqueous water-soluble polymer solution from the feed 3 for dispersion medium into the screw mixer 4 through piping by using a liquid delivery pump 5 while the CNTs charged into the feeder 2 were transferred. In this manner, the CNTs were impregnated with the aqueous solution of the water-soluble polymer in the screw mixer 4 to obtain wet aggregates (CNTs impregnated with the aqueous water-soluble polymer solution), which were continuously supplied into a cutter mill 6.

Subsequently, the wet aggregates were continuously shear-crushed by the cutter mill 6. At this time, the crushed products were self-aggregated, and aggregates of granular crushed products were produced. The obtained aggregates of the granular crushed products were dried with hot air using a drying device 7 to obtain CNT-blended aggregates.

Figure 2:
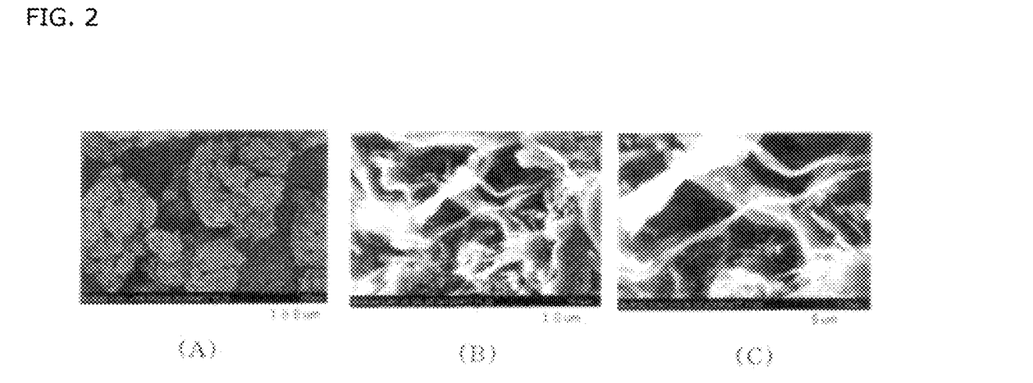
FIG. 2 shows scanning electron microscope (SEM) images of CNT-blended aggregates of Example 1, in which A, B and C are 300×, 5000× and 12,000×SEM images, respectively.

When the physical properties (bulk density, porosity, carbon content rate, and particle size) of the obtained CNT-blended aggregates were measured by the following technique, the results obtained were as shown in Table 2. Further, when the CNT-blended aggregates were observed with an electron microscope, the results obtained were as shown in FIGS. 2A to 2C. In the CNT-blended aggregates, no formation of bundle aggregation sites between the CNTs was confirmed.

<Bulk Density>

The bulk density was determined in accordance with the method for measuring the bulk density of carbon black specified in JIS K6219.

<Carbon Content Rate>

The carbon content rate was determined by subtracting the ash content (%) measured in accordance with JIS K 6218-2 from 100%.

<Particle Size>

The forms of the CNT-blended aggregates were observed with a scanning electron microscope (SEM). The observation was performed using a 300×SEM image. Specifically, the outer diameters of 100 CNT-blended aggregates were arbitrarily measured, and a number average value thereof was taken as an average particle size (mm) of the CNT-blended aggregates.

TABLE 2

|  | Physical properties |
| --- | --- |
| Bulk density (g/cm$^3$) | 0.15 to 0.30 |
| Carbon content (% by mass) | 90 or more |
| Average particle size (mm) | 1.4 |

Comparative Example 1

First, polyethylene (High Wax 320P, manufactured by Mitsui Chemicals, Inc.), as a water-insoluble polymer, was dissolved in an organic solvent xylene heated to 80 to 90° C., to prepare a resin binder solution containing 3% by weight of polyethylene.

Next, 50 g of CNTs and 4,950 g of pure water were placed in a 10-L stainless steel round container and treated with a homogenizer type stirrer at 6,000 rpm for 30 minutes to obtain a dispersion liquid.

Next, an impeller blade of the stirrer was changed to a paddle blade, and 300 g of the resin binder solution was added dropwise at a uniform rate for 5 minutes while the dispersion liquid was stirred at 1,000 rpm. After the solution was completely added dropwise, the obtained mixed solution was stirred at 600 rpm for about 5 minutes to produce granules in the mixed solution.

Next, the granules were separated from the mixed solution using a 60-mesh sieve. The obtained granules were naturally dried in a draft at room temperature for about 20 hours, and further heated at 90 to 110° C. using a vacuum dryer, and dried until the amounts of the remaining xylene and water were reduced to 0.5% or less by heating at 150° C. for 1 hour to obtain CNT-blended aggregates.

Since xylene is prohibited from being dissipated to the atmosphere, the entire amount of xylene was recovered by a vacuum cooling trap.

Figure 3:
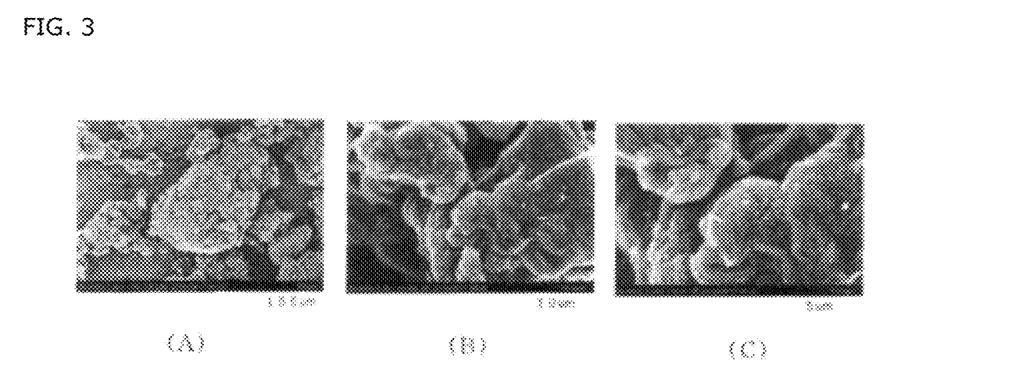
FIG. 3 shows SEM images of CNT-blended aggregates of Comparative Example 1, in which A, B and C are 300×, 5000× and 12000×SEM images, respectively.

The physical properties (bulk density, porosity, CNT content rate, and particle size) of and manufacture rate for the obtained CNT-blended aggregates were as indicated in Table 3. Further, when the CNT-blended aggregates were observed with SEM, the results obtained were as shown in FIGS. 3A to 3C. Formation of bundle aggregation sites between the CNTs was confirmed.

TABLE 3

|  | Physical properties |
| --- | --- |
| Bulk density (g/cm$^3$) | 0.2 to 0.5 |
| Carbon content (% by mass) | 90 or more |
| Average particle size (mm) | 1.8 |

From the results indicated in Tables 2 and 3, it is understood that, in Example 1 in which the water-soluble polymer was added to the dispersion medium (water) and subjected to the shear-crushing treatment, CNT-blended aggregates having a large amount of CNTs blended therein and a high bulk density were efficiently and continuously manufactured in a short time, as compared with Comparative Example 1. Since the CNT-blended aggregates were manufactured without using an organic solvent in the method of Example 1, it is considered that the method can be utilized to reduce the environmental load. Further, in the method of Example 1, the CNTs were used to manufacture wet aggregates having low scattering properties in a closed system, and to quickly and continuously manufacture aggregates having a high bulk density through shear-crushing, and thus it is possible to prevent scattering of the CNTs and to greatly reduce the risk to safety.

INDUSTRIAL APPLICABILITY

The present invention makes it possible to efficiently manufacture a CNT-blended aggregate having a high bulk density and low scattering properties using water as a dispersion medium. The present invention makes it possible to manufacture a CNT-blended aggregate without substantially using an organic solvent, and thus is advantageous in reducing the environmental load.

Further, the present invention can considerably improve operability including processability and handleability when acquiring CNT-blended aggregates, and shorten the manufacturing process without requiring large-scale facility. In addition, the present invention is particularly advantageous in industrial production because CNT-blended aggregates having a good particle size distribution can be mass-produced at low cost.

REFERENCE SIGNS LIST

1: CNT-blended aggregate manufacturing apparatus
2: Feeder for main raw material
3: Feeder for dispersion medium
4: Screw mixer
5: Liquid delivery pump
6: Cutter mill
7: Drying device

The invention claimed is:

1. A method for manufacturing a carbon nanotube-blended aggregate, comprising the steps of:
   (1) providing an aqueous solution of a water-soluble polymer having a concentration of 0.005 to 3.0% by mass;
   (2) impregnating carbon nanotubes with the aqueous solution of the water-soluble polymer in a proportion of 400 to 1,000 parts by mass relative to 100 parts by mass of the carbon nanotubes to prepare a wet aggregate;
   (3) shear-crushing the wet aggregate to obtain an aggregate of crushed products and (4) drying the aggregate of the crushed products to obtain a carbon nanotube-blended aggregate comprising the water-soluble polymer.

2. The method according to claim 1, wherein the wet aggregate preparation step (1) is continuously carried out using a screw conveyor.

3. The method according to claim 1, wherein the wet aggregate has a water content, at room temperature, of 600 to 980 parts by mass based on 100 parts by mass of the carbon nanotubes.

4. The method according to claim 1, wherein the water-soluble polymer is polydiallyldimethylammonium chloride.

5. The method according to claim 1, wherein the shear-crushing treatment in step (3) is continuously performed using a cutter mill.

6. The method according to claim 5, wherein the cutter mill is a multi-stage cutter mill.

7. The method according to claim 1, wherein the drying step (4) is carried out by hot air drying.

8. The method according to claim 1, wherein the carbon nanotube-blended aggregate has a bulk density of 0.15 to 0.30 g/cm$^3$.

9. The method according to claim 1, wherein the carbon nanotube-blended aggregate has an average particle size of 0.5 to 2.0 mm.

10. The method according to claim 1, wherein the carbon nanotube-blended aggregate has a porosity of 15 to 30%.

* * * * *